United States Patent [19]
Roza

[11] 3,962,635
[45] June 8, 1976

[54] TRANSMISSION SYSTEM FOR PULSE SIGNALS OF FIXED CLOCK FREQUENCY USING A FREQUENCY SELECTIVE CIRCUIT IN A CLOCK FREQUENCY RECOVERY CIRCUIT TO AVOID PHASE JITTER

[75] Inventor: Engel Roza, Eindhoven, Netherlands

[73] Assignee: U.S. Philips Corporation, New York, N.Y.

[22] Filed: Jan. 17, 1975

[21] Appl. No.: 541,727

[30] Foreign Application Priority Data
Jan. 21, 1974 Netherlands........................ 7400760

[52] U.S. Cl............................. 325/13; 179/15 AD
[51] Int. Cl.²........................................... H04B 7/14
[58] Field of Search.............. 325/7, 13, 17, 62, 63; 179/15 AD

[56] References Cited
UNITED STATES PATENTS

| | | | |
|---|---|---|---|
| 2,662,118 | 12/1953 | Schouten et al. | 325/13 |
| 3,085,200 | 4/1963 | Goodall | 325/13 |
| 3,491,298 | 1/1970 | Jager et al. | 325/13 |
| 3,593,140 | 7/1971 | Kaneko | 325/13 |

Primary Examiner—Robert L. Griffin
Assistant Examiner—Jin F. Ng
Attorney, Agent, or Firm—Frank R. Trifari; Simon L. Cohen

[57] ABSTRACT

A transmission system for pulse signals of fixed clock frequency with regenerative repeaters located in the transmission path, each being provided with a pulse regenerator and a clock extraction circuit recovering the clock frequency for the control of the pulse regenerator from the received pulse signals with the aid of a frequency selective circuit. The use of a special type of frequency selective circuit results, especially in transmission systems having a large number of regenerative repeaters, in a considerable reduction of the phase jitter of the recovered clock signal in the receiver without detrimentally influencing the acquisition of the clock frequency in the individual regenerative repeaters.

5 Claims, 16 Drawing Figures

$\tau_1 = R_1 C$
$\tau_2 = R_2 C$

$\tau_1 = R_1 C_2$
$\tau_2 = R_2 C_2$

TRANSMISSION SYSTEM FOR PULSE SIGNALS OF FIXED CLOCK FREQUENCY USING A FREQUENCY SELECTIVE CIRCUIT IN A CLOCK FREQUENCY RECOVERY CIRCUIT TO AVOID PHASE JITTER

The invention relates to a transmission system for pulse signals of fixed clock frequency, comprising a transmitter, a receiver and a number of regenerative repeaters located in the transmission path, each being provided with a pulse regenerator and a clock extraction circuit recovering the clock frequency for the control of the pulse regenerator from the received pulse signals with the air of a frequency selective circuit. Such transmission systems are generally known and are used for transmitting pulse code modulation signals, synchronous telegraphy and data signals, and the like.

In such transmission systems special difficulties occur in practice due to phase jitter of the clock signal recovered in the receiver relative to the original clock signal in the transmitter. This phase jitter is caused by imperfections in the transmission system such as, for example, the presence of noise, variations in the components, intersymbol interference of signal pulses and amplitude-phase conversion. Particularly in transmission systems having a large length and in transmission systems for pulse signals having very high clock frequencies in which a large number of regenerative repeaters is included, this phase jitter of the recovered clock signal may have a large effective value which increases with the number of regenerative repeaters.

It is an object of the invention to realize in a simple manner a considerable reduction of the effective value of phase jitter of the recovered clock signal in a transmission system of the kind described in the preamble particularly in systems using a large number of regenerative repeaters.

The transmission system according to the invention is characterized in that the frequency selective circuit has a normalized phase transfer function whose absolute value as a function of the frequency is substantially constant from the frequency zero to a first corner frequency, monotonously decreases from the first corner frequency to a second corner frequency, is again substantially constant from the second corner frequency to a third corner frequency and again decreases monotonously for frequencies which are higher than the third corner frequency.

In this description in which the frequency selective circuit is used for recovering the clock frequency, the phase transfer function will be understood to mean the function giving the relationship between the spectra of the phase jitter of the clock frequency at the input and the output of the frequency selective circuit.

The invention and its advantages will now be described in greater detail with reference to the Figures.

Figures 1, 2, 3:
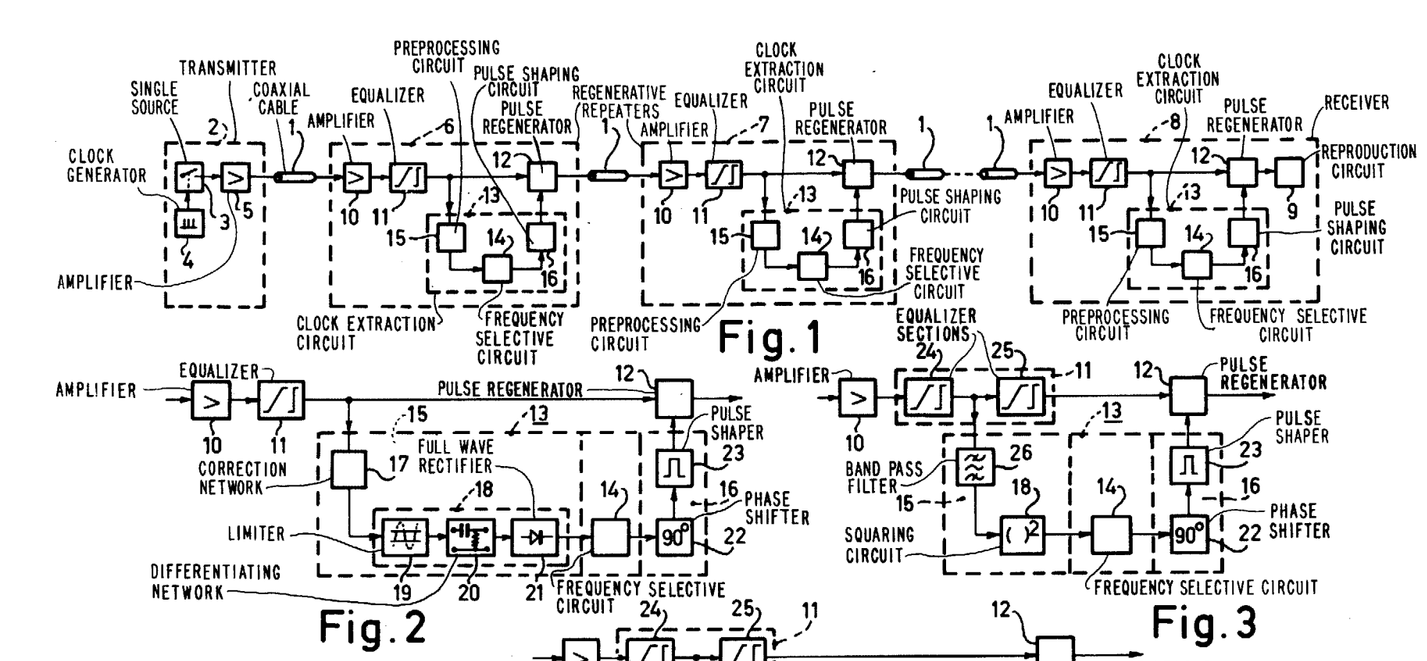
FIG. 1 shows a transmission system according to the invention.
FIGS. 2, 3 and 4 show possible embodiments of the regenerative repeaters in the transmission system of FIG. 1

FIG. 1 shows a transmission system for the transmission of pulse signals having a fixed clock frequency, for example, PCM-signals having polar pulses, through a transmission path in the form of a coaxial cable 1. The pulse signals originate from a transmitter 2 in which a signal source 3 only supplies signal pulses at instants determined by a clock frequency of a clock generator 4. These pulse signals are amplified in an amplifier 5 and transmitted through regenerative repeaters 6, 7 ... incorporated at regular distances in the cable 1 to a receiver 8 including a reproduction circuit 9.

The regenerative repeaters 6, 7, ... and also the receiver 8 each include an amplifier 10 and an equalizer 11 connected thereto for equalizing the amplitude and phase characteristics of the preceding cable section and a pulse regenerator 12 for regenerating the received signal pulses as to shape and instant of occurrence. The pulse regenerator 12 is connected to a clock extraction circuit 13 which recovers the clock frequency for controlling the pulse regenerator 12 from the received pulse signals with the aid of a frequency-selective circuit 14. Furthermore the clock extraction circuit 13 includes a preprocessing circuit 15 for obtaining a signal component at the clock frequency and a pulse shaping circuit 16 for obtaining clock pulses of a shape required for pulse regenerator 12.

In the conventional transmission channels the bandwidth is limited to such an extent that no components of clock frequency occur in the transmitted pulse signals. This means that a non-linear signal processing is necessary in the clock extraction circuit 13 of the regenerative repeaters 6, 7 ... and the receiver 8 so as to recover the clock frequency from the received pulse signals. FIGS. 2 and 3 show in greater detail how this non-linear signal processing can be performed in such a manner that the recovered clock frequency does not have phase errors due to intersymbol interference of the signal pulses.

For the purpose of pulse regeneration the equalizer 11 in FIG. 2 is generally adjusted in such a manner that the transmission channel satisfies the first Nyquist criterion (no intersymbol interference at the nominal regeneration instants). The preprocessing circuit 15 connected to equalizer 11 then includes a correction network 17 which cooperates with equalizer 11 for obtaining a channel satisfying the second Nyquist criterion (halfway between two successive regeneration instants no intersymbol interference other than that of two successive symbols). The output signal of correction network 17 is then applied to a non-linear circuit 18 for generating pulses having a short duration at the instants when this signal exceeds a threshold corresponding to the signal value of a single pulse halfway between two successive clock instants. In the embodiment of FIG. 2 this non-linear circuit 18 is constituted by a slicer 19 whose limiting values are adjusted on either side of the zero level, followed by a differentiating network 20 for the sliced signal and a full-wave rectifier 21. Owing to the frequency-doubling action of this non-linear circuit 18 a series of pulses is produced at the output of the preprocessing circuit 15 in which a component of clock frequency is present, which component is filtered out with the aid of frequency selective circuit 14 and is applied in pulse shaping circuit 16 through a 90° phase shifting network 22 to a pulse shaper 23 supplying clock pulses of a shape required for pulse regeneration to pulse regenerator 12. If equalizer 11 is adjusted in such a manner that the transmission channel itself already satisfies the second Nyquist criterion, the correction network 17 in preprocessing circuit 15 may be omitted.

FIG. 3 shows a further possibility for non-linear signal processing which is particularly suited for pulse signals having a high clock frequency. The equalizer 11 in FIG. 3 consists of two sections 24, 25 in which the first equalizer section 24 serves for obtaining substantially flat amplitude and delay characteristics of the transmission channel while in the second equalizer section 25 these characteristics of the transmission channel are modified for the purpose of pulse regeneration in such a manner that, for example, the first Nyquist criterion is satisfied. The preprocessing circuit 15 of the clock extraction circuit 13 is then connected to the first equalizer section 24 and includes a bandpass filter 26 tuned to half the clock frequency which cooperates with the equalizer section 24 for obtaining a channel having transmission characteristics which are symmetrical relative to half the clock frequency. The output signal from bandpass filter 26 is squared in a non-linear circuit 18 in the form of a squaring stage so that a signal is produced which has a frequency equal to the clock frequency whose amplitude changes, but whose phase does not. The component of clock frequency is again filtered out with the aid of the frequency selective circuit 14 and the clock pulses for controlling pulse regenerator 12 are derived therefrom in pulse shaping circuit 16.

Figure 4:
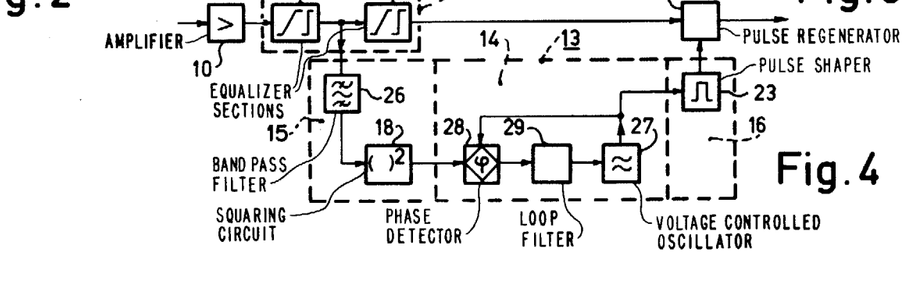

In the majority of the known transmission systems the frequency selective circuit is a narrow bandpass filter in the form of a resonant circuit having a quality factor in the order of 100. In addition, a frequency selective circuit in the form of a phase locked loop is also used, generally with a loop filter of the first order and a relatively high loop gain. FIG. 4 shows a modification of FIG. 3 in which such a phase locked loop is used as a frequency selective circuit 14. This loop includes a voltage controlled oscillator 27 whose rest frequency is substantially equal to the clock frequency and whose output is connected to the pulse shaping circuit 16 and to a first input of a phase detector 28. The output of preprocessing circuit 15 is connected to the second input of phase detector 28 whose output voltage is applied to a loop filter 29 for obtaining a control voltage for the frequency control of oscillator 27. In view of the known 90° phase difference between the two input signals of phase detector 28 of the 90° phase shifting network 22 in pulse shaping circuit 16 is absent in FIG. 4.

In spite of the pulse regeneration as to shape and instant of occurrence in the regenerative repeaters 6, 7, ... and the receiver 8 it is found that the regenerated signal pulses in the receiver 8 occur at instants which fluctuate about the instants determined by clock generator 4 in the transmitter 2. Especially in transmission systems having a large number of regenerative repeaters 6, 7, ... in the transmission path, this phase jitter of the recovered clock signal in the receiver 8 relative to the reference clock signal in the transmitter 2 is found to increase to very large effective values which are inadmissible for several applications.

The invention realises a considerable reduction of the effective value of this phase jitter in that the frequency selective circuit 14 has a normalized phase transfer function whose absolute value as a function of the frequency is substantially constant from the frequency zero to a first corner frequency $f_1$, monotonously decreases from the first corner frequency $f_1$ to a second corner frequency $f_2$, is again substantially constant from the second corner frequency $f_2$ to a third corner frequency $f_3$ and again decreases monotonously for frequencies which are higher than the third corner frequency $f_3$.

As is known, the phase function of a circuit indicates how the spectra of the phase modulation of a signal component of given frequency at the input and the output of this circuit are related to each other. In the relevant case a signal component of clock frequency $f_b$ is selected by the frequency selective circuit 14. When this component at the input of circuit 14 has the shape:

$$a_i(t)\cos[\omega_b t + \theta_i(t)] \qquad (1)$$

in which $a_i(t)$ is the varying amplitude and $\theta_i(t)$ is the phase jitter of the clock frequency $\omega_b = 2\pi_b$, and at the output the shape:

$$a_o(t)\cos[\omega_b t + \theta_o(t)] \qquad (2)$$

in which $a_o(t)$ and $\theta_o(t)$ likewise indicate the varying amplitude and the phase jitter, and when furthermore the functions $\theta_i(t)$ and $\theta_o(t)$ have Fourier-Transforms $\theta_i(\omega)$ and $\theta_o(\omega)$, the phase transfer function $H(\omega)$ of selective circuit 14 for the clock frequency $\omega_b$ is equal to the quotient of $$\theta_o(\omega) \text{ and } \theta_i(\omega):$$

$$\theta_o(\omega) / \theta_i(\omega) = H(\omega) \qquad (3a)$$

so that there applies $$\theta_o(\omega) = H(\omega) \cdot \theta_i(\omega) \qquad (3b)$$

Normalization of $H(\omega)$ means that the absolute value $|H(\omega)|$ for the frequency zero is equal to 1.

Figure 5:
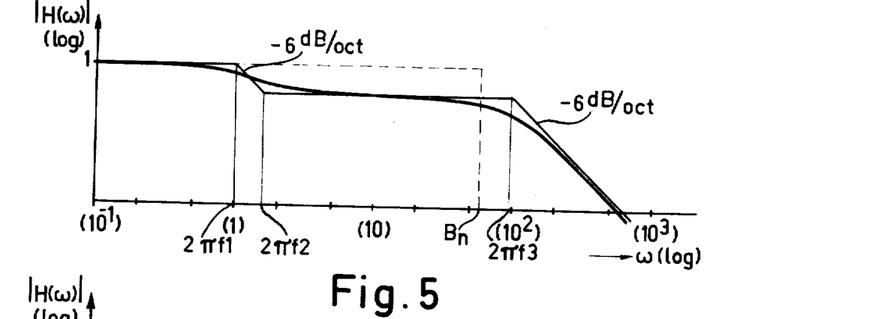
FIGS. 5 and 6 show frequency diagrams to explain the invention.

FIG. 5 shows an example of the variation of the absolute value $|H(\omega)|$ of a phase transfer function $H(\omega)$ for a frequency selective circuit 14 according to the invention. The radial frequency $\omega = 2\pi f$ is plotted on a logarithmic scale on the horizontal axis and $|H(\omega)|$ is likewise plotted on a logarithmic scale on the vertical axis. In this example it has been assumed that $H(\omega)$ is of the second order with two real poles corresponding to the first and third corner frequencies $f_1$ and $f_3$, respectively, and a real zero located between the poles and corresponding to the second corner frequency $f_2$. FIG. 5 also shows the asymptotes of $|H(\omega)|$ which are horizontal in the intervals $(0, 2\pi f_1)$ and $(2\pi f_2, 2\pi f_3)$ and have a slope of -6dB per octave in the intervals $(2\pi f_1, 2\pi f_2)$ and $(2\pi f_3, \infty)$.

The invention will now be explained in greater detail. Due to different causes phase jitter of the recovered clock signal occurs in each of the regenerative repeaters 6, 7, ... and each of these regenerative receivers 6, 7, ... contributes to the ultimate phase jitter in the receiver 8. It has been found from experiments that of all causes contributing to the ultimate phase jitter the causes correlated with the pattern of the pulse signals themselves that is varying as a function of time are the most important. Since this pulse pattern is the same for each regenerative repeater 6, 7 ... the phase jitter caused in each regenerative repeater 6, 7, ... is also the same.

If the phase jitter at the input of a regenerative repeater has a more or less uniform spectral distribution over the frequency range covered by the phase transfer function $H(\omega)$ of the frequency selective circuit 14 and phase jitter caused by imperfections in the preprocessing circuit 15 as a result of intersymbol interference of the signal pulses does not have any pronounced spectral components in the frequency range, then it may be assumed for phase jitter at the output of frequency selective circuit 14 that:

$$\theta_1(\omega) = c.H(\omega) \tag{4}$$

in which $c$ is a constant. This relation, however, only applies to the first repeater 6. The second repeater 7 not only supplies the same own contribution but also gives a response to the contribution supplied by the first repeater 6 which response adds coherently to its own contribution. With the use of formulas (3b) and (4) there follows for the phase jitter at the output of the frequency selective circuit 14 in the second repeater 7 that:

$$\theta_2(\omega) = c\ H(\omega) + H(\omega).\ \theta_1(\omega) = c\ H(\omega) + c\ H(\omega) + c\ H(\omega)^2 \tag{5}$$

Likewise there applies for the phase jitter at the output of repeater N:

$$\theta_N(\omega) = c\ H(\omega) + H(\omega).\ \theta_{N-1}(\omega) \tag{6}$$

Since all contributions are coherent for all regenerative repeaters process the same pulse pattern) there applies for the phase jitter after N repeaters:

$$\theta_N(\omega) = c\ H(\omega) + c\ H(\omega)^2 + ... + c\ H(\omega)^N \tag{7a}$$

or:

$$\theta_N(\omega) = c\ H(\omega) \cdot \frac{H(\omega)^N - 1}{H(\omega) - 1} \tag{7b}$$

The effective value of the phase jitter after N repeaters is then found by integrating formula (7) over the frequency range:

$$\overline{\theta_N^2} = (\tfrac{1}{2}\pi) \int_{-\infty}^{\infty} |\theta_N(\omega)|^2 d\omega \tag{8}$$

For the present invention, particularly the increase of this effective value with the number of repeaters N is important for which purpose the normalized effective value $\delta$ is introduced by the relation:

$$\delta^2 = \overline{\theta_N^2} / \overline{\theta_1^2} \tag{9}$$

Figure 6:
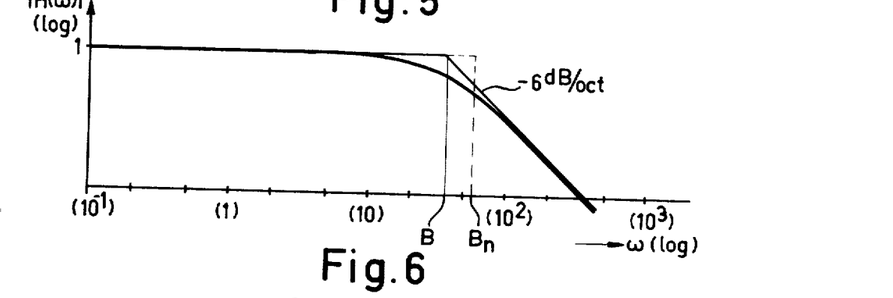

If a resonant circuit is used as a frequency selective circuit 14 with a resonant frequency $\omega_0 = \omega_b$ and a quality factor $\Phi$, the phase transfer function $H(\omega)$ is given by:

$$H(\omega) = \frac{1}{1 + j\omega/B} \tag{10}$$

in which $2B = \omega_0/\Phi$ is the bandwidth of the resonant circuit. According to formula (10) the phase transfer function for the resonant frequency in the resonant circuit corresponds to the transfer function of its equivalent lowpass filter. More generally this applies to the phase transfer function for the central frequency of each symmetrical bandpass filter. In FIG. 6 the variation of $|H(\omega)|$ is shown for $H(\omega)$ according to formula (10) in which B in FIG. 6 and $f_1, f_2, f_3$ in FIG. 5 are related in a manner to be further described.

Figure 7:
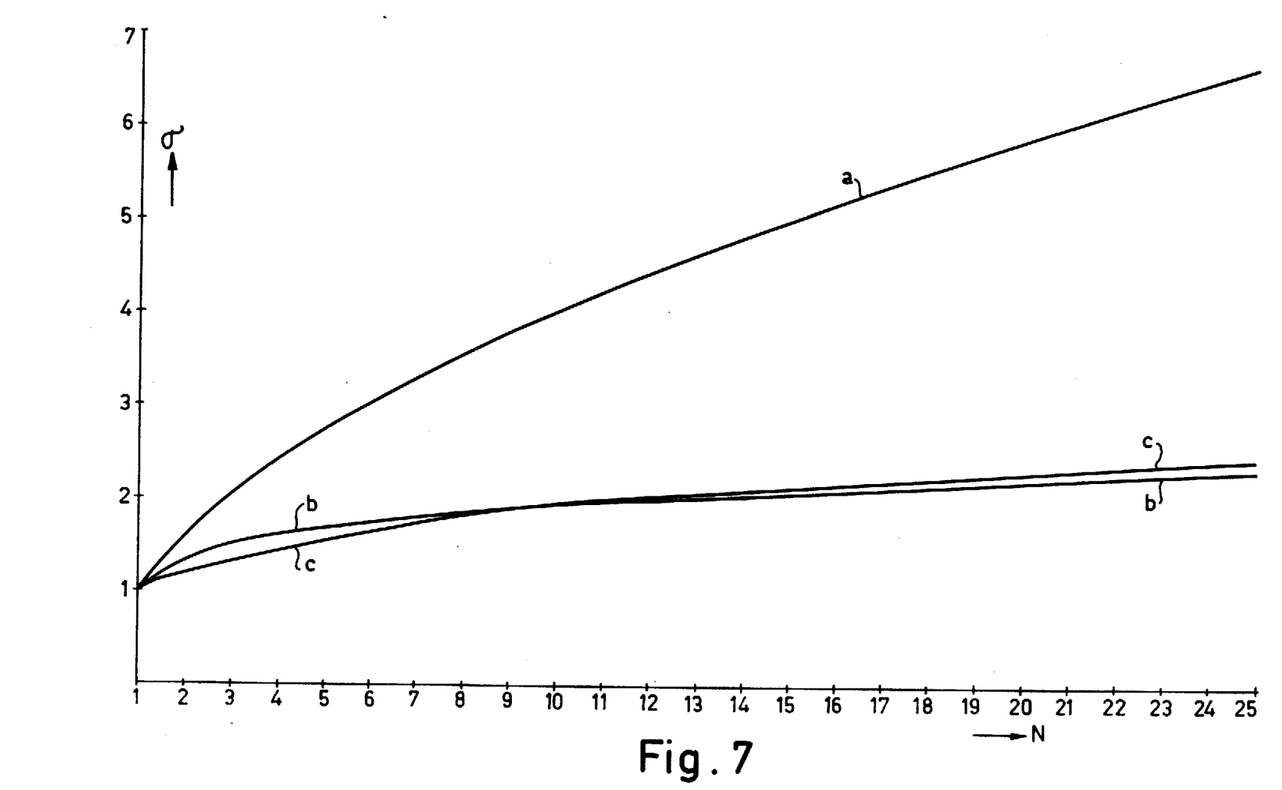
FIG. 7 shows a graph for illustrating the result achieved by the steps according to the invention.

When $H(\omega)$ according to formula (10) is substituted in formula (7b) and the calculations according to formulas (8) and (9) are performed, it is found that the normalized effective value $\delta$ of the phase jitter exclusively depends on the number N of the repeaters and for large values on N increases substantially proportionally with $\sqrt{N}$. In FIG. 7 the variation of $\delta$ thus calculated as a function of N when using a resonant circuit as a frequency selective circuit 14 is represented by curve $a$; this calculated variation is experimentally confirmed completely.

When on the other hand a frequency selective circuit 14 according to the invention is used, the normalized effective value $\delta$ of the phase jitter decreases considerably less faster with the number N of the repeaters than is the case when using a resonant circuit. When the calculations according to formulas (8) and (9) are performed for a frequency selective circuit 14 with a phase transfer function $H(\omega)$ whose absolute value $|H(\omega)|$ has the variations shown, for example, in FIG. 5, then $\delta$ varies as a function of N in accordance with curve $b$ of FIG. 7. Also this variation completely corresponds to the values found in extensive experiments. FIG. 7 shows that in this case the normalized effective value of the phase jitter for the transmission system according to the invention with 25 repeaters corresponds to that of the known transmission system with 4 repeaters in which a resonant circuit is utilised as a frequency selective circuit.

The fact that the use of the step according to the invention considerably reduces the phase jitter in the relevant transmission system as compared with that in the known transmission system may be evident in a simple manner by multiplying in both systems the phase transfer function of the frequency selective circuit by itself for a number of times, by determining for the resultant phase transfer function the surface below the curve of its absolute value and by comparing this surface with the surface below the curve of the absolute value of the original phase transfer function. This procedure corresponds to that which actually takes place in the transmission system: according to formula (7a) the contribution of repeater $k$ to the phase jitter $\theta_N(\omega)$ after N repeaters is equal to c $H(\omega)$, the own contribution, multiplied (N-k) times by $H(\omega)$.

A first impression of the reduction can be obtained by applying the above-mentioned procedure to the surface below the asymptotes of $|H(\omega)|$ in FIG. 5 and FIG. 6. In both cases H(ω) is normalized, thus |H(ω)| = 1 for ω = 0 so that the resultant surface after a large number of multiplications is equal to $2\pi f_1$ in FIG. 5 and B in FIG. 6 and the ratio $2\pi f_1/B$ gives a first impression of the reduction.

It is assumed that in both transmission systems the acquisition of the clock frequency in a repeater has the same behavior. Since this acquisition behavior is predominantly determined by the noise bandwidth of the frequency selective circuit, it is particularly assumed that the noise bandwidth in both cases is the same. For the normalized phase transfer functions H(ω) the following relation applies to the noise bandwidth $B_n$ $$B_n = \int_{-\infty}^{\infty} |H(\omega)|^2 \, d\omega \qquad (11)$$

As is known, $B_n$ is the bandwidth of an imaginary rectangular filter which in response to white noise of a given density produces the same output noise as the considered network with a transfer function H(ω). In FIGS. 5 and 6 this imaginary filter is denoted by broken lines; in FIG. 6 the known relation $B_n = \pi B/2$ applies.

The remaining freedom in the choice of the corner frequencies $f_1, f_2, f_3$ may then be utilized to make the ratio $2\pi f_1/B$ as small as possible within the limitations of a practical embodiment. When $f_3$ is chosen to be much higher than $f_1$ and furthermore $f_2$ much closer to $f_1$ than to $f_3$, then this results in the ratio $2\pi f_1/B_n$ which is much lower than 1. Since it is assumed that $B_n$ is both cases has the same value and since furthermore there applies that $B_n = \pi B/2$ it also follows that the ratio $2\pi f_1/B$ is much lower than 1. In FIG. 5 there applies, for example, $f_3 = 99 f_1$ and $f_2 = 1.67 f_1$ from which follows that $2\pi f_1/B_n = 1/58$ and $2\pi f_1/B = 1/37$.

Though the above considerations based on asymptotes make it clear that in the relevant transmission system a considerable reduction of phase jitter occurs, they cannot be used for an accurate determination of the reduction and certainly not for the variation of the normalized effective value δ of the phase jitter as a function of the number N of the repeaters. This becomes manifest from FIG. 6 in which the surface below the asymptotes approaches a constant value after a large number of multiplications while the surface below the curve itself continues to decrease continuously and this substantially inversely proportional to the square root of the number of multiplications.

In this manner the result of the use of the steps according to the invention is a considerable reduction of the ultimate phase jitter of the recovered clock signal in the receiver without the satisfactory acquisition of the clock frequency in the individual regenerative repeaters being detrimentally influenced in any way.

In addition to the advantage of a very large reduction of phase jitter while maintaining a satisfactory acquisition behavior the transmission system according to the invention has the advantage that it can be realized in a simple manner. The frequency selective circuit 14 may be formed as a symmetrical bandpass filter having a central frequency which is equal to the clock frequency and a transfer function whose lowpass equivalent corresponds to the desired phase transfer function. Such bandpass filters may be realized with the aid of conventional filter synthesis techniques. Furthermore, it is alternatively possible to realize such a bandpass filter as a conventional transversal filter having a tapped delay line in which the tapped signals can be weighted in a suitable manner and combined to the desired output signal.

Another attractive possibility in practice for obtaining the desired phase transfer function is to utilize a special type of phase locked loop as a frequency selective circuit 14.

Figures 8, 9:
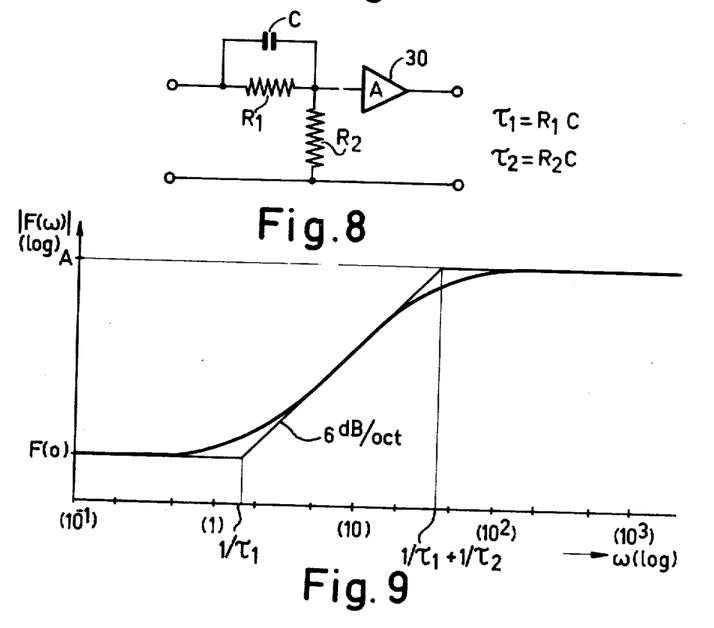
FIG. 8 shows a filter used in a regenerative repeater of FIG. 4.
FIG. 9 shows a frequency diagram of the filter of FIG. 8.

To this end a first order phase-lead loop filter 20 is used in the phase locked loop as shown in FIG. 4 instead of the conventional phase-lag loop filter. A possible embodiment of such a loop filter 29 is shown in FIG. 8. This filter consists of a series impedance constituted by a resistor $R_1$ in parallel with a capacitor C and a shunt impedance constituted by a resistor $R_2$ while the junction of these impedances is connected to an amplifier 30 having an amplification factor A. The transfer function F(ω) of the filter in FIG. 8 is given by:

$$F(\omega) = F(o) \ \frac{b}{a} \ \left( \frac{j\omega + a}{j\omega + b} \right) \qquad (12)$$

where $$a = 1/\tau_1 = 1/R_1C \qquad (13a)$$

$$b = 1/\tau_1 + 1/\tau_2 = 1/R_1C + 1/R_2C \qquad (13b)$$

$$f(o) = A \ \tau_2/(\tau_1 + \tau_2) = AR_2/(R_1+R_2) \qquad (13c)$$

in which F(o) is the gain of the filter for the frequency zero (d.c. gain). The variation of the absolute value |F(ω)| is shown in FIG. 9. As FIG. 9 shows, |F(ω)| for the frequency zero has a value F(o) which is not equal to zero and |F(ω)| remains substantially constant up to a corner frequency $\omega = 2\pi f = 1/\tau_1$, increases monotonously to a corner frequency $\omega = 2\pi f = 1/\tau_1 + 1/\tau_2$ and is again substantially constant for higher frequencies, namely equal to A.

For the phase locked loop in FIG. 4 the phase transfer function H(ω) is given by the closed loop transfer function for which the following known relation applies (see, for example, F. M. Gardner, "Phaselock Techniques" John Wiley & Sons, Inc., 1966, pages 7–10):

$$H(\omega) = \frac{K_o K_d F(\omega)}{j\omega + K_o K_d F(\omega)} \qquad (14)$$

in which $K_o$ is the gain constant of the voltage controlled oscillator 27 (VCO gain constant) with the dimension of rad. per sec. per volt and $K_d$ is the gain factor of the phase detector 28 (phase-detector gain factor) with the dimension of volt per rad. Substitution of formula (12) in formula (14) then results in:

$$H(\omega) = \frac{K_v(b/a) \ (j\omega) + K_v b}{(j\omega)^2 + b(1+K_v/a) \ (j\omega) + K_v b} \qquad (15)$$

where $$K_v = K_o K_d \ F(o) \qquad (16)$$

The factor $K_v$ is known as the velocity constant with the dimension of $(\text{sec.})^{-1}$. It is common practice in the description of a phase locked loop to introduce the natural frequency $\omega_n$ and the attenuation factor $\xi$ as parameters and to write formula (15) as:

$$H(\omega) = \frac{\omega_n(2\xi - \omega_n/K_v)(j\omega) + \omega_n^2}{(j\omega)^2 + 2\xi\omega_n(j\omega) + \omega_n^2} \quad (17)$$

where $$\omega_n^2 = K_v b \quad (18a)$$

$$2\omega_n \xi = b(1 + K_v/a) \quad (18b)$$

The fact that the desired variation of $|H(\omega)|$ is indeed found for $H(\omega)$ according to formula (17) may be determined by considering $H(\omega)$ as a general transfer function of the second order with a real zero and two real poles (the poles must be real because otherwise the amplitudes of some frequencies are increased so that certain spectral components of the phase jitter become much stronger as the number of repeaters increases). A necessary condition for this desired variation is that the corner frequency $f_2$ which corresponds to the zero is located between the corner frequencies $f_1$ and $f_3$ which correspond to the poles. This means that the following relation must be satisfied:

$$\xi - \sqrt{\xi^2 - 1} < (2\xi - \omega_n/K_v)^{-1} < \xi + \sqrt{\xi^2 - 1} \quad (19)$$

With the aid of formulas (18a) and (18b) and after some manipulation the condition can be rewritten as:

$$b > a \quad (20)$$

According to formulas (13a) and (13b) this condition is indeed satisfied by using the loop filter in FIG. 8.

As already described in the foregoing it is favorable for achieving the largest possible reduction of the phase jitter to choose $f_3$ much larger than $f_1$ and to choose $f_2$ much closer to $f_1$ than to $f_3$. It follows from formula (19) that the attenuation factor $\xi$ must have a high value and that the factor $(\omega_n/K_v)$ must be of the same order of magnitude as $2\xi$. The latter means that the phase locked loop must have a low loop gain $K_v$. The natural frequency $\omega_n$ must not be used to give $(\omega_n/K_v)$ the same order of magnitude as $2\xi$ because the noise bandwidth $B_n$ would be increased thereby as is apparent from the relation for $B_n$ at $H(\omega)$ defined by formula (17):

$$B_n = (\pi\omega_n/\xi)\left[1 + (2\xi - \omega_n/K_v)^2\right] \quad (21)$$

For the practical realization the low loop gain means that a stable voltage controlled oscillator 27 must be used whose rest frequency is as accurately equal to the clock frequency as possible. In this manner the quasi-static phase error $\theta_{eo}$ as a result of a frequency difference $\Delta\omega$ between rest and clock frequency given by $\theta_{eo} = \Delta\omega/K_v$ (22)

is maintained sufficiently low. It is found that the low loop gain can be obtained without exceeding the limits imposed in practice for the quasi-static phase error by using a crystal stabilized voltage controlled oscillator (VCXO).

When choosing the attenuation factor $\xi = 5$ and the factor $(\omega_n/K_v) = 4$ for the phase locked loop with the loop filter of FIG. 8, the variation of $|H(\omega)|$ for $H(\omega)$ according to formula (17) exactly corresponds to that in FIG. 5 for $\omega_n/10 = 2\pi f_1$. Furthermore formulas (12), (13) and (14) show that the frequencies associated with the zeros of $F(\omega)$ and $H(\omega)$ coincide and that then $1/\tau_1 = 2\pi f_2$.

The above described phase locked loop must have a low loop gain $K_v$ so as to achieve the desired phase transfer function and also requires the use of a frequency-stable oscillator 27 so as to maintain the quasi-static phase error $\theta_{eo}$ sufficiently small. This requirement can be satisfied by using a crystal stabilized oscillator. This possibility is, however, now very attractive for very high clock frequencies (more than 100 MHz) because crystals are then no longer available so that frequency multipliers must be used starting from a crystal having the highest possible resonant frequency. Moreover such crystals have spurious resonant frequencies causing unwanted peaks in the phase transfer function.

Figure 10:
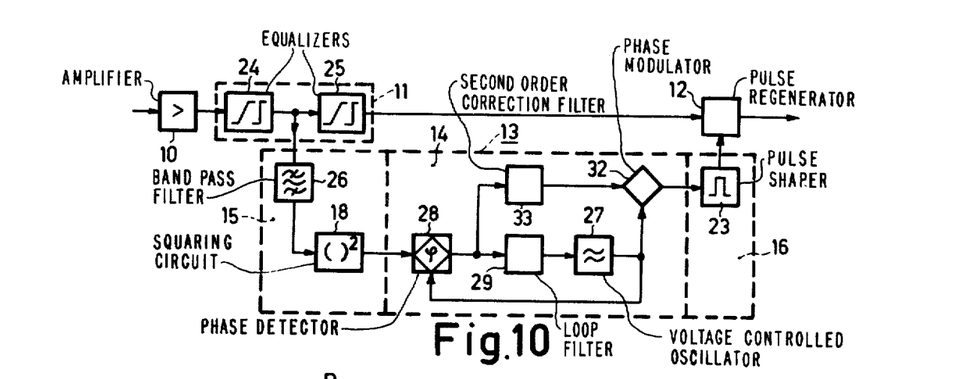
FIG. 10 shows a modification of a regenerative repeater according to FIG. 4.

FIG. 10 shows a modification of the regenerative repeater according to FIG. 4 which does not require a high frequency-stability of the voltage-controlled oscillator 27 and which is thus very suitable for very high clock frequencies.

Figure 11:
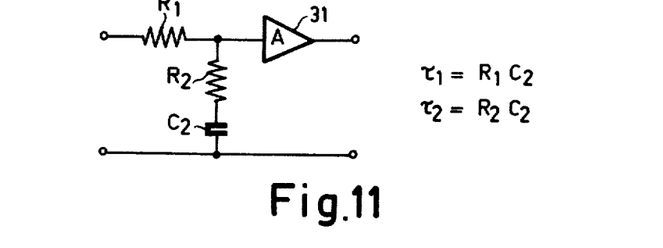
FIG. 11 shows a filter used in a regenerative repeater according to FIG. 10.

In FIG. 10 the requirement of a small quasi-static phase error $\theta_{eo}$ is satisfied by using a phase-lag loop filter 29 having a high loop gain $K_v$. A possible embodiment of such a loop filter 29 is shown in FIG. 11. This filter consists of a series impedance constituted by a resistor $R_1$ and a shunt impedance constituted by a resitor $R_2$ in series with a capacitor $C_2$, an amplifier 31 having an amplification factor A being connected to the junction of the impedances. The transfer function $F(\omega)$ of this filter is given by:

$$F(\omega) = F(o) \frac{b}{a} \left(\frac{j\omega + a}{j\omega + b}\right) \quad (23)$$

with the same shape as formula (12) in which, however:

$$a = 1/\tau_2 = 1/R_2 C_2 \quad (24a)$$

$$b = 1/(\tau_1 + \tau_2) = 1/(R_1 + R_2)C_2 \quad (24b)$$

$$F(o) = A \quad (24c)$$

Figure 12:
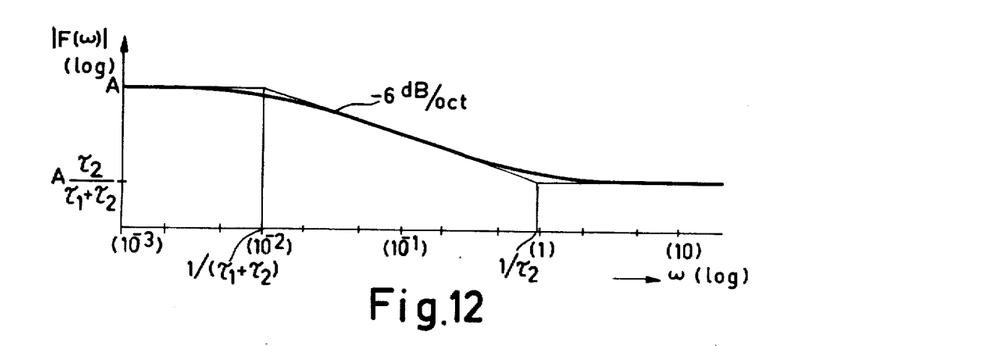
FIG. 12 shows a frequency diagram of the filter according to FIG. 11.

The variation of the absolute value $|F(\omega)|$ is shown in FIG. 12. As FIG. 12 shows, $|F(\omega)|$ has the value $F(o)$ which is unequal to zero for the frequency zero and $|F(\omega)|$ remains substantially constant up to a corner frequency $\omega = 1/(\tau_1 + \tau_2)$, then decreases monotonously to a corner frequency $\omega = 1/\tau_2$ and is again substantially constant for higher frequencies and is equal to $A \tau_2/(\tau_1 + \tau_2)$. For the sake of clarity the scales along the horizontal and vertical axes in FIG. 12 deviate from those in FIGS. 5, 6 and 9.

The phase transfer function $H(\omega)$ for the phase locked loop in FIG. 10 is given by the same formulas (14)–(18) as for that in FIG. 4 in which, however, several parameters have different values. To illustrate the influence of the loop gain $K_v$ on the variation of the absolute value $|H(\omega)|$, the same values of the natural frequency $\omega_n$ and the attenuation factor $\xi$ are chosen for both loops in FIG. 4 and FIG. 10. It follows from formula (17) that $H(\omega)$ has the same real poles in both cases, but the location of the real zero is dependent on the loop gain $K_v$. In FIG. 4 $K_v$ has been chosen to be so low that the factor $(\omega_n/K_v)$ is of the same order of magnitude as $2\xi$ and the corner frequency which corresponds to the zero is located between the corner frequencies corresponding to the poles. On the other hand $K_r$ in FIG. 10 is chosen to be so high that the factor $(\omega_n/K_r)$ is completely negligible relative to $2\xi$ so that for sufficiently large values of $\xi$ the corner frequencies corresponding to the zero and the pole of the lowest frequency are located very closely together. Furthermore the use of the loop filter according to FIG. 11 means that the corner frequency associated with the zero is lower than the corner frequency associated with the pole located nearby because the necessary condition can be reduced to:

$$b < a \qquad (25)$$

which latter condition is indeed satisfied as is apparent from formulas (24a) and (24b).

The variation of $|H(\omega)|$ for the loop of FIG. 4 with the loop filter of FIG. 8 exactly corresponds to that in FIG. 5 for the values $\omega_n/10 = 2\pi f_1$, $\xi = 5$, and $(\omega_n/K_r) = 4$. For the same values of $\omega_n$ and $\xi$ but with such a high value of $K_r$ that $(\omega_n/K_r) = 0.001$, $|H(\omega)|$ for the loop of FIG. 10 with the loop filter of FIG. 11 has the variation shown in FIG. 13. The corner frequencies associated with the poles are equal in FIG. 5 and FIG. 13, namely $f_1$ and $f_3 = 99f_1$. For the corner frequency associated with the zero there applies that $f_2 = 1.67f_1$ in FIG. 5 and $f'_2 = 0.99 f_1$ in FIG. 13.

For the loop filter of FIG. 11 the abovementioned choice of $\omega_n$, $\xi$ and $K_r$ means that on account of formulas (18a) and (24b) for the frequency associated with the pole of $F(\omega)$ there applies that $1/(\tau_1 + \tau_2) = 2\pi f_1/100$ while on account of on formulas (23), (24a) and (14) for the frequency associated with the zero of $F(\omega)$ there applies that $1/\tau_2 = 2\pi f'_2 = 0.99(2\pi f_1)$. The variation shown in FIG. 12 is in conformity therewith.

Formula (22) for the quasi-static phase error may be rewritten as:

$$\theta_{ro} = (\omega_n/K_r) \cdot (\Delta\omega/\omega_n) \qquad (26)$$

from which it follows that $\theta_{ro} = 4(\Delta\omega/\omega_n)$ for the loop of FIG. 4 and $\theta_{ro} = 0.001 (\Delta\omega/\omega_n)$ for the loop of FIG. 10. Since for both loops $\omega_n$ has the same value, a much larger frequency difference $\Delta\omega$ between rest and clock frequency can be admitted for a prescribed value of $\theta_{ro}$ in FIG. 10 than in FIG. 4. In practice this means that no crystal-stabilized oscillator 27 need be used in FIG. 10, but that, even at very high clock frequencies, it is sufficient to use an LC-oscillator which can more easily be realized.

Figure 13:
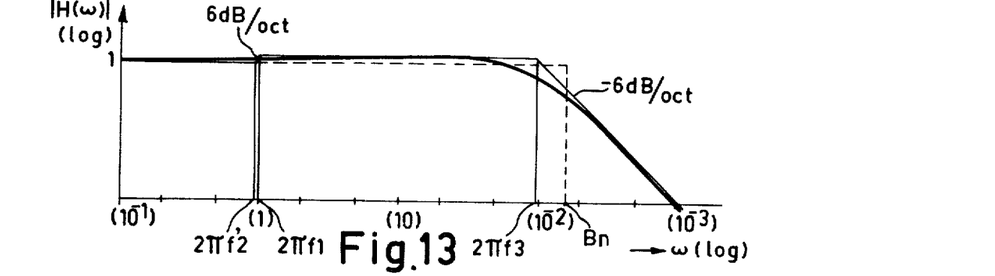
FIG. 13 shows a frequency diagram to explain the operation of the regenerative repeater according to FIG. 10.

According to formula (21) this advantage is achieved in FIG. 10 at the expense of an increase of the noise bandwidth $B_n$ which is indicated in FIG. 13 in the same manner as in FIGS. 5 and 6. It is, however, much more important that the variation of $|H(\omega)|$ shown in FIG. 13 does not result in the desired reduction of the phase jitter in the relevant transmission system. This may be readily evident in a simple manner by using the procedure used for FIGS. 5 and 6 on the surface below the asymptotes of $|H(\omega)|$ in FIG. 13. Even if the fact is not taken into account that the horizontal asymptote in the interval $(2\pi f_1, 2\pi f_3)$ is located at a value which is higher than 1 (be it only slightly higher), the resultant surface after a larger number of multiplications is equal to $2\pi f_3$ while in FIG. 5 the value $2\pi f_1$ is found. Since $f_3 = 99f_1$, this consideration based on asymptotes makes it clear that the variation according to FIG. 13 is not suitable for the reduction of phase jitter.

In spite of all this, a considerable reduction of phase jitter is realized when using the loop filter of FIG. 11 in the phase locked loop of the regenerative repeater of FIG. 10 in that the frequency selective circuit 14 in FIG. 10 is provided with a phase modulator 32 whose carrier input is connected to the output of the voltage-controlled oscillator 27, whose input is connected to the pulse regenerator 12 and whose modulation input is connected to the output of the phase detector 28 through a second order correction filter 33 having a suitably chosen transfer function $X(\omega)$.

The operation of the frequency selective circuit 14 in FIG. 10 will now be described with reference to a signal component of clock frequency. If this component at the input of circuit 14 is given by formula (1) and at the output of oscillator 27 by formula (2), the output voltage $v_d(t)$ of phase detector 28 has the shape:

$$v_d(t) = K_d [\theta_i(t) - \theta_o(t)] \qquad (27)$$

in which $K_d$, as before, is the gain factor of phase detector 28. A voltage $v_m(t)$ then occurs at the output of correction filter 33, which is given by:

$$v_m(t) = \int_{-\infty}^{\infty} v_d(t-\tau) \times (\tau) \, d\tau \qquad (28)$$

in which $x(t)$ is the impulse response of correction filter 33.

The output signal from oscillator 27 is phase-modulated by this voltage $v_m(t)$ in phase modulator 32. If this output signal itself does not show any phase jitter, the voltage $v_m(t)$ would cause a phase modulation:

$$\theta_m(t) = k_m v_m(t) \qquad (29)$$

in which $K_m$ is the gain factor of phase modulator 32 with the dimension of rad. per volt. However, since the output signal from oscillator 27 has a phase jitter $\theta_o(t)$, a signal component of clock frequency occurs at the output of phase modulator 32 and hence at the output of circuit 14, which component has the following shape:

$$\cos[\omega_n t + \theta_u(t)] \qquad (30)$$

in which $\theta_u(t) \neq \theta_m(t)$. In practice both $\theta_o(t)$ and $\theta_m(t)$ are found to be small relative to $\pi$ rad. and in that case it can be shown that superposition may be used so that there applies:

$$\theta_u(t) = \theta_o(t) + K_m v_m(t) \qquad (31)$$

The use of Fourier transformation on the formulas (27), (28) and (31) then yields the following relation:

$$\theta_u(\omega) = \theta_o(\omega) + K_m K_d [\theta_i(\omega) - \theta_o(\omega)] \cdot X(\omega) \qquad (32)$$

in which $\theta_u(\omega)$, $\theta_o(\omega)$ and $\theta_i(\omega)$ are the Fourier-Transforms of $\theta_u(t)$, $\theta_o(t)$ and $\theta_i(t)$, respectively, and furthermore $X(\omega)$ is the transfer function of correction filter 33. With the aid of formula (3b) formula (32) may be rewritten as $$\theta_u(\omega) / \theta_i(\omega) = H(\omega) + K_m K_d [1 - H(\omega)] \cdot X(\omega) \qquad (33)$$

in which $H(\omega)$ is the phase transfer function of the phase locked loop in FIG. 10 which is given by formula (17). The phase transfer function $P(\omega)$ of circuit 14 is then given by the quotient of $\theta_u(\omega)$ and $\theta_i(\omega)$ so that, based on formula (33), there applies:

$$P(\omega) = H(\omega) + L(\omega) = H(\omega) + K_m K_d [1 - H(\omega)] X(\omega) \quad (34)$$

The foregoing considerations show that the absolute value $|P(\omega)|$ is to have the variation according to FIG. 5 so as to realize the desired reduction of the phase jitter. Such a variation would be obtained if there applied:

$$P(\omega) = \frac{(2\xi - \alpha)\omega_n(j\omega) + \omega_n^2}{(j\omega)^2 + 2\xi\omega_n(j\omega) + \omega_n^2} \quad (35)$$

where $\alpha$ is of the same order of magnitude as $2\xi$; for $\xi = 5$ and $\alpha = 4$ the variation of FIG. 5 is then exactly obtained. As has been shown in the foregoing, an oscillator 27 having a very high frequency-stability would be necessary in that case so as to maintain the quasi-static phase error sufficiently small. To evade this difficulty $L(\omega)$, the phase transfer function of the connection between the input and output of circuit 14 through correction filter 33 is chosen to be such that $L(\omega)$ in the vicinity of $\omega = 0$ is substantially zero so that $P(\omega)$ is exclusively determined there by $H(\omega)$, the phase transfer function of the phase locked loop having a high loop gain. On the other hand it has also been found that $H(\omega)$ for frequencies which are unequal to zero and certainly for $\omega > 2\pi f_1$ has a behavior which is not suitable for the reduction of phase jitter. Therefore $L(\omega)$ is chosen to be such that the unwanted behavior of $H(\omega)$ is compensated for so that $P(\omega)$ for $\omega > 2\pi f_1$ is given in a satisfactory approximation by formula (35).

The above-mentioned requirements are satisfied if there applies:

$$L(\omega) = - \frac{(\alpha - \omega_n/K_v)\omega_n(j\omega)}{(j\omega)^2 + 2\xi\omega_n(j\omega) + \omega_n^2} \cdot L_1(\omega) \quad (36)$$

in which $L_1(\omega) = 0$ for $\omega = 0$ and furthermore $|L_1(\omega)|$ monotonously increases from $\omega = 0$ to a corner frequency which is an order of magnitude lower than $2\pi f_1$ and for higher frequencies is substantially constant, namely equal to 1. On account of formulas (34), (36) and (17) there must apply for the transfer function $X(\omega)$ of correction filter 33:

$$X(\omega) = - \frac{(\alpha - \omega_n/K_v)\omega_n}{K_m K_d} \cdot \frac{1}{(j\omega) + \omega_n^2/K_v} L_1(\omega) \quad (37)$$

Figure 14:
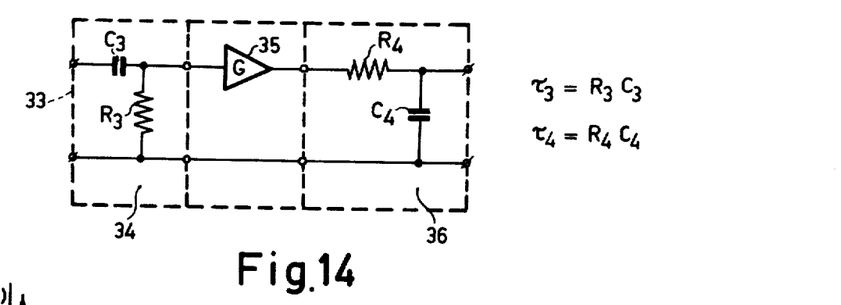
FIG. 14 shows a correction filter used in a regenerative repeater according to FIG. 10, FIGS. 15 and 16 show frequency diagrams of component parts of the correction filter according to FIG. 14.

A possible embodiment of such a correction filter 33 is shown in FIG. 14. This filter consists of a cascade arrangement of a first order network 34, a separation amplifier 35 having a high gain factor G and a first order network 36. Network 34 is constituted by a series capacitor $C_3$ and a shunt resistor $R_3$, while network 36 is constituted by a series resistor $R_4$ and a shunt capacitor $C_4$. The transfer functions $X_1(\omega)$ and $X_2(\omega)$ of networks 34 and 36, respectively, are:

$$X_1(\omega) = \frac{j\omega}{j\omega + 1/\tau_3} \quad (38)$$

$$X_2(\omega) = \frac{1}{\tau_4} \cdot \frac{1}{j\omega + 1/\tau_4} \quad (39)$$

in which $$\tau_3 = R_3 C_3 \quad (40a)$$

$$\tau_4 = R_4 C_4 \quad (40b)$$

The transfer function of the filter of FIG. 14 may then be written as:

$$G \cdot X_2(\omega) \cdot X_1(\omega) = \frac{G}{\tau_4} \left( \frac{1}{j\omega + 1/\tau_4} \right) \left( \frac{j\omega}{j\omega + 1/\tau_3} \right) \quad (41)$$

Figure 15:
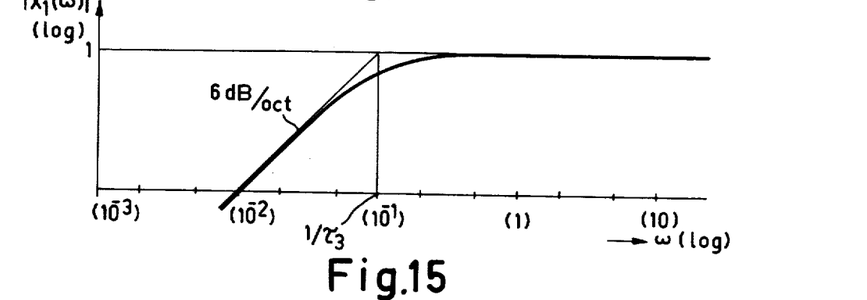
Figure 16:
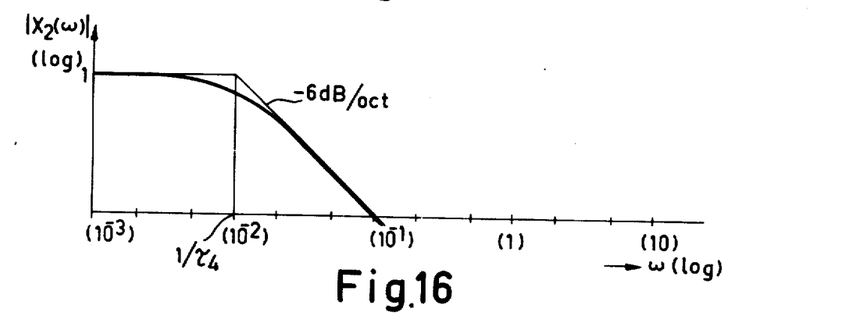

The variation of the absolute values $|X_1(\omega)|$ and $|X_2(\omega)|$ is shown in FIG. 15 and FIG. 16 in which the same scale is used along the horizontal axes as in FIG. 12. As these Figures show, $|X_1(\omega)|$ increases monotonously from a value 0 at the frequency of zero up to a corner frequency $\omega = 1/\tau_3$ and for higher frequencies it is substantially constant, namely equal to 1, while $|X_2(\omega)|$ for the frequency zero has the value of 1 and remains substantially constant up to a corner frequency $\omega = 1/\tau_4$ and then monotonously decreases for higher frequencies.

If in FIG. 14 the value $\tau_3$ is chosen to be such that $1/\tau_3 = 2\pi f_1/10$, $X_1(\omega)$ according to formula (38) satisfies the requirements for $L_1(\omega)$. When in addition the values G and $\tau_4$ in FIG. 14 are chosen to be such that $$G/\tau_4 = - \frac{(\alpha - \omega_n/K_v)\omega_n}{K_m K_d} \quad (42)$$

$$1/\tau_4 = \omega_n^2 / K_v \quad (43)$$

then it follows from formula (41) that the transfer function of the filter in FIG. 14 indeed satisfies the requirements imposed by formula (37) on the transfer function $X(\omega)$ of the correction filter 33 of FIG. 10.

For the phase locked loop in FIG. 10 there applies $\omega_n/10 = 2\pi f_1$ and $(\omega_n/K_v) = 0.001$ so that it follows from formula (43) that $1/\tau_4 = 2\pi f_1/100$ and hence $X_2(\omega)$ has a corner frequency which is two orders of magnitude lower than $2\pi f_1$. If further the value $\alpha = 4$ is chosen in FIG. 10, the value $G = -3999$ follows from formula (42) for $K_m K_d = 1$, so that amplifier 35 in FIG. 14 is an inverting amplifier having a large gain factor.

For the above-mentioned choice of the parameters in FIG. 10 the variation of $|P(\omega)|$ for the circuit 14 is substantially equal to that for $|H(\omega)|$ in FIG. 5 so that also when using the regeneration repeater according to FIG. 10 in the relevant transmission system a considerable reduction of phase jitter is obtained. In addition the embodiment according to FIG. 10 has the important advantage that also for very high clock frequencies it is not necessary to use a crystal-stabilized oscillator 27 so as to maintain the quasi-static phase error within the limits imposed in practice, but that it is sufficient to use an LC-oscillator which can more easily be realized.

When using the resonant circuit as a frequency selective circuit 14 in the known transmission systems, it has already been proposed to break the systematic character of the contributions of the individual regenerative repeaters 6, 7, ... to the ultimate phase jitter in the receiver 8 and to convert it into a noise-comparable character. To this end equal code converters are used in all regenerative repeaters 6, 7, ... which code converters convert an incoming pulse pattern into an outgoing pulse pattern differing from the outgoing pulse patterns of all preceding regenerative repeaters 6, 7, ... . With the aid of an inverse code converter in the transmitter 2 or the receiver 8 it is then realised that the pulse patterns in transmitter and receiver unambiguously correspond to each other (see L. E. Zegers, "The Reduction of Systematic Jitter in a Transmission Chain with Digital Regenerators," IEEE Transactions on Communication Technology, Vol. COM-15, No. 4, August 1967, pages 542–551). It has been mathematically and experimentally proved that the normalized effective value $\sigma$ of the phase jitter as a function of the number N of the regenerative repeaters varies in that case in accordance with curve $c$ in FIG. 7 in which $\sigma$ for large values of N increases substantially proportionally to $\sqrt[4]{N}$ instead of to $\sqrt{N}$ as in curve $a$. When curves $b$ and $c$ in FIG. 7 are compared with curve $a$ it is once more found which remarkable results are obtained when using the steps according to the invention. These results may be further improved considerably by using the steps proposed for the known transmission system (code conversion in all regenerative repeaters) also in the present transmission system.

What is claimed is:

1. A transmission system for pulse signals of fixed clock frequency, comprising a transmitter; a receiver; a transmission path connecting said transmitter to said receiver; and a number of regenerative repeaters located in the transmission path, each of said regenerative repeaters comprising a pulse regenerator, and a clock extraction circuit means including frequency selective circuit means for recovering pulse signals of said fixed clock frequency for for controlling the pulse regenerator, said frequency selective circuit means has a normalized phase transfer function whose absolute value as a function of the frequency is substantially constant from the frequency zero to a first corner frequency, monotonously decreases from the first corner frequency to a second corner frequency, is again substantially constant from the second corner frequency to a third corner frequency and again decreases monotonously for frequencies which are higher than the third corner frequency.

2. A transmission system as claimed in claim 1, in which the frequency selective circuit means has a prescribed noise bandwidth, said third corner frequency is much higher than the first corner frequency and the second corner frequency is much closer to the first corner frequency than to the third corner frequency.

3. A transmission system as claimed in claim 1, characterized in that the frequency selective circuit means has a phase transfer function of the second order with two real poles corresponding to the first and third corner frequencies, respectively, and a real zero point corresponding to the second corner frequency.

4. A transmission system as claimed in claim 1, in which the frequency selective circuit means is constituted by a phase locked loop comprising a voltage controlled oscillator, a loop filter and a phase detector, the voltage controlled oscillator output is connected to the pulse regenerator and to a first input of said phase detector, means for applying received pulse signals to the second input of said phase detector, said loop filter being connected to the output of said phase detector and to the input of said voltage controlled oscillator, the phase detector output voltage being applied as a frequency control voltage to the voltage controlled oscillator via said loop filter, said loop filter is a first order loop filter and has a transfer function whose absolute value as a function of the frequency has a substantially constant value unequal to zero from the frequency zero to a first corner frequency corresponding to said second corner frequency of the phase transfer function, monotonously increases from this first corner frequency to a second corner frequency and is again substantially constant for frequencies higher than this second corner frequency.

5. A transmission system as claimed in claim 1, in which the frequency selective circuit means is constituted by a phase locked loop including a voltge controlled oscillator, a first loop filter and a phase detector, the voltage controlled oscillator output is connected to the pulse regenerator and to a first input of said phase detector, means for applying received pulse signals to the second input of said phase detector, said first loop filter being connected to the output of said phase detector and to the input of said voltage controlled oscillator, the phase detector output voltage being applied as a frequency control voltage to the voltage controlled oscillator via said first loop filter, said first loop filter has a transfer function whose absolute value as a function of the frequency has a substantially constant value unequal to zero from the frequency zero up to a first corner frequency which is two orders of magnitude lower than said first corner frequency of the phase transfer function, monotonously decreases from this first corner frequency to a second corner frequency which is substantial equal to said first corner frequency of the phase transfer function, and is again substantially constant for higher frequencies than this second corner frequency, the frequency selective circuit further includes a phase modulator whose carrier input is connected to an output of the voltage-controlled oscillator, whose output is connected to the pulse regenerator and whose modulation input is connected to the output of the phase detector via a second order correction filter, said second order correction filter includes a first order network, an inverting amplifier having a gain factor which is much larger than one, and a further first order network connected in cascade, said first order network having a transfer function whose absolute value as a function of the frequency increases monotonously from the value zero at the frequency zero up to a first corner frequency which is an order of magnitude lower than said first corner frequency of the hase transfer function, and is substantially constant for higher frequencies than this first corner frequency, said further first order network having a transfer function whose absolute value as a function of the frequency has a substantially constant value unequal to zero from the frequency zero up to a first corner frequency which is two orders of magnitude lower than said first corner frequency of the phase transfer function, and monotonously decreases for frequencies which are higher than this first corner frequency.

* * * * *

UNITED STATES PATENT AND TRADEMARK OFFICE
CERTIFICATE OF CORRECTION

PATENT NO. : 3,962,635
DATED : June 8, 1976
INVENTOR(S) : ENGEL ROZA

It is certified that error appears in the above-identified patent and that said Letters Patent are hereby corrected as shown below:

Col. 1, line 14, "air" should be --aid--;

Col. 4, line 22, after "phase" should be --transfer--;

line 33, "$\omega_b = 2\pi_b$" should be --$\omega_b = 2\pi f_b$--;

Col. 6, line 25, "on N" should be --of N--;

Col. 7, line 31, "is both" should be --in both--;

Col. 9, line 50, "[" second occurence should be --]--;

Col. 14, line 3, in equation (38) "$J\omega$" should be --$j\omega$--;

Claim 3, line 1, cancel "char-";

line 2, "acterized in that the" should be --said--;

Signed and Sealed this

Twenty-third Day of November 1976

[SEAL]

Attest:

RUTH C. MASON
*Attesting Officer*

C. MARSHALL DANN
*Commissioner of Patents and Trademarks*